(12) United States Patent
Liang

(10) Patent No.: US 12,340,515 B2
(45) Date of Patent: Jun. 24, 2025

(54) IMAGE EDGE DETECTION METHOD AND IMAGE EDGE DETECTION DEVICE

(71) Applicant: SigmaStar Technology Ltd., Fuijan (CN)

(72) Inventor: Yu Liang, Shanghai (CN)

(73) Assignee: SIGMASTAR TECHNOLOGY LTD, Fujian (CN)

( * ) Notice: Subject to any disclaimer, the term of this patent is extended or adjusted under 35 U.S.C. 154(b) by 419 days.

(21) Appl. No.: 17/899,686

(22) Filed: Aug. 31, 2022

(65) Prior Publication Data
US 2023/0237668 A1 Jul. 27, 2023

(30) Foreign Application Priority Data

Jan. 27, 2022 (CN) .......................... 202210102432.8

(51) Int. Cl.
G06T 7/13 (2017.01)
G06T 5/73 (2024.01)
(52) U.S. Cl.
CPC .................. G06T 7/13 (2017.01); G06T 5/73 (2024.01); *G06T 2207/20076* (2013.01)
(58) Field of Classification Search
CPC .... G06T 7/13; G06T 7/10; G06T 7/00; G06T 5/73; G06T 2207/20076; G06T 2207/10004; G06T 5/20
See application file for complete search history.

(56) References Cited

U.S. PATENT DOCUMENTS

| | | | | |
|---|---|---|---|---|
| 9,202,267 B1 * | 12/2015 | Yang | .......................... | G06T 5/73 |
| 9,547,887 B2 * | 1/2017 | Liang | ................... | G06T 3/4076 |
| 2006/0072844 A1 * | 4/2006 | Wang | ........................ | G06T 5/70 |
| | | | | 382/254 |
| 2010/0054606 A1 * | 3/2010 | Mishima | ................... | G06T 7/13 |
| | | | | 382/199 |
| 2014/0153843 A1 * | 6/2014 | Aghagolzadeh | .......... | G06T 5/73 |
| | | | | 382/299 |
| 2020/0311893 A1 * | 10/2020 | Jobara | ....................... | G06T 5/73 |

FOREIGN PATENT DOCUMENTS

DE 102016111327 A1 * 12/2017

OTHER PUBLICATIONS

Carnegie Mellon University, "Detecting corners", 2019, pp. 35-95. Accessed from: https://www.cs.cmu.edu/~16385/s19/ (Year: 2019).*

* cited by examiner

*Primary Examiner* — Sumati Lefkowitz
*Assistant Examiner* — Anna Lei
(74) *Attorney, Agent, or Firm* — Edell, Shapiro & Finnan, LLC

(57) ABSTRACT

An image edge detection method for processing an image including multiple pixels includes performing a convolution operation on the image by a gradient operator in a first direction and a gradient operator in a second direction to obtain a first-direction gradient data and a second-direction gradient data, wherein the first direction is perpendicular to the second direction, performing a gradient statistical calculation within a neighboring area of a target pixel of the image according to the first-direction gradient data and the second-direction gradient data to obtain a gradient statistic, and determining an edge significance corresponding to the target pixel according to the gradient statistic.

13 Claims, 5 Drawing Sheets

IMAGE EDGE DETECTION METHOD AND IMAGE EDGE DETECTION DEVICE

This application claims the benefit of China application Serial No. CN202210102432.8, filed on Jan. 27, 2022, the subject matter of which is incorporated herein by reference.

BACKGROUND OF THE INVENTION

Field of the Invention

The present application relates to an image edge detection method and an image edge detection device, and more particularly to an image edge detection method and an image edge detection device applied for image noise reduction and image sharpening.

Description of the Related Art

Current image processing techniques include determining whether an edge in an image is directional by means of an edge detection method, for example, an edge detection method can determine whether an edge is directional according to an edge gradient. However, in case of a weak edge or a strong texture, such edge detection method may render an inaccurate detection result, further affecting edge information needed for image sharpening and image noise reduction, and leading to a blurred edge or an obvious noise at an edge.

More specifically, a conventional edge detection technique calculates gradients in different directions of an image according to a Sobel operator, and considers an area having a larger gradient as a directional edge. However, if the gradient of a directional texture is not large enough, it is possible that the method above recognizes the texture as an edge and thus results in a misjudgment. Or, for a weaker directional edge, it may be difficult for the method above to detect such directional edge. Therefore, there is a need for an improvement for the prior art.

SUMMARY OF THE INVENTION

In view of the issues above, it is a primary object of the present disclosure to provide an image edge detection method and an image edge detection device so as to effectively detect a directional edge in an image.

According to an embodiment of the present application, an image edge detection method for processing an image including multiple pixels includes performing a convolution operation on the image by a gradient operator in a first direction and a gradient operator in a second direction to obtain a first-direction gradient data and a second-direction gradient data, wherein the first direction is perpendicular to the second direction, performing a gradient statistical calculation within a neighboring area of a target pixel of the image according to the first-direction gradient data and the second-direction gradient data and accordingly obtaining a gradient statistic, and determining an edge significance corresponding to the target pixel according to the gradient statistic.

According to another embodiment of the present application, an image edge detection device for processing an image including multiple pixels includes: a convolution circuit, including a first convolution circuit unit and a second convolution circuit unit, configured to perform a convolution operation on the image by a gradient operator in a first direction and a gradient operator in a second direction, respectively, to obtain a first-direction gradient data and a second-direction gradient data, wherein the first direction is perpendicular to the second direction; a statistics circuit, configured to perform a gradient statistical calculation within a neighboring area of a target pixel of the image according to the first-direction gradient data and the second-direction gradient data to obtain a gradient statistic; and a determining circuit, configured to determine an edge significance corresponding to the target pixel according to the gradient statistic.

BRIEF DESCRIPTION OF THE DRAWINGS

To better describe the technical solution of the embodiments of the present application, drawings involved in the description of the embodiments are introduced below. It is apparent that, the drawings in the description below represent merely some embodiments of the present application, and other drawings apart from these drawings may also be obtained by a person skilled in the art without involving inventive skills.

DETAILED DESCRIPTION OF THE INVENTION

Figure 1:
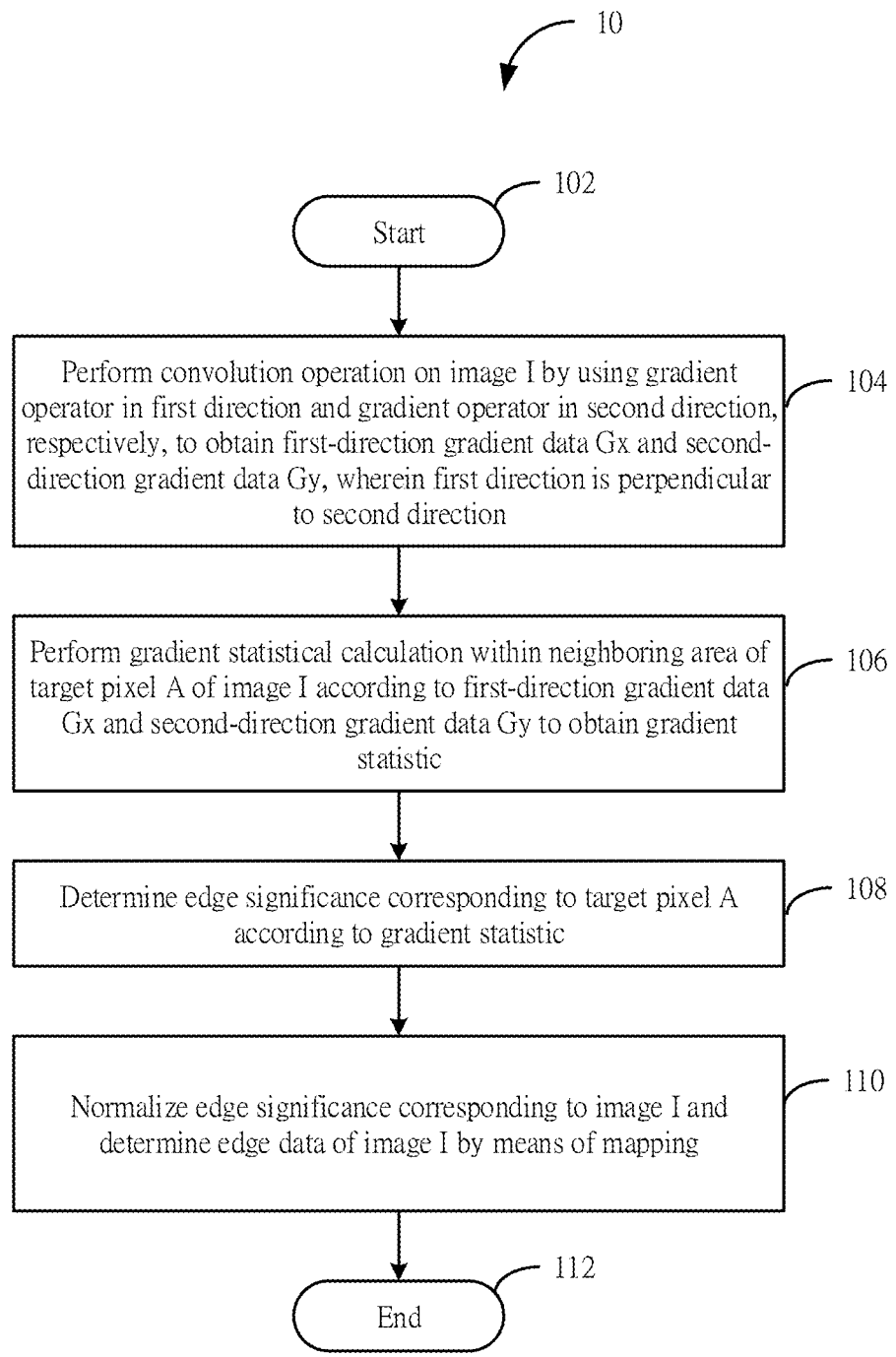
FIG. 1 is a schematic diagram of an image edge detection method according to an embodiment of the present application.
Figure 2:
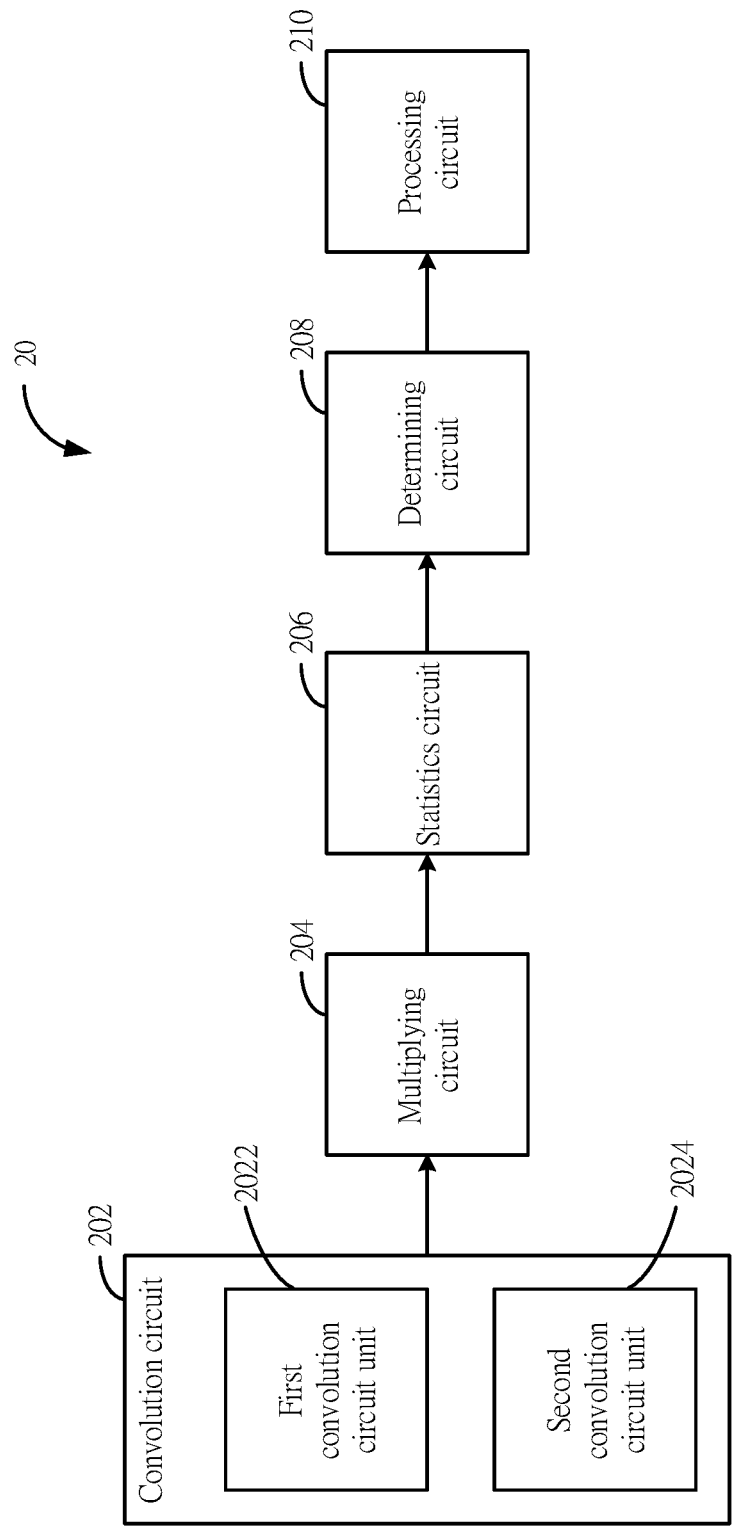
FIG. 2 is a schematic diagram of an image edge detection device according to an embodiment of the present application.

Refer to FIG. 1 and FIG. 2. FIG. 1 shows a schematic diagram of an image edge detection method 10 according to an embodiment of the present application. FIG. 2 shows a schematic diagram of an image edge detection device 20 according to an embodiment of the present invention. The image edge detection device 20 can be used to perform the image edge detection method 10 so as to process an image I including multiple pixels. The image edge detection device 20 includes a convolution circuit 202, a multiplying circuit 204, a statistics circuit 206, a determining circuit 208 and a processing circuit 210.

Method 10 begins at start step 102. In step 104, the image edge detection method 10 performs a convolution operation on the image by using a gradient operator in a first direction and a gradient operator in a second direction, respectively, to obtain a first-direction gradient data Gx and a second-direction gradient data Gy, wherein the first direction is perpendicular to the second direction.

More specifically, a first convolution circuit unit 2022 and a second convolution circuit unit 2024 of the convolution circuit 202 can perform the convolution operation on all pixels of the image I by using the gradient operator in the first direction and the gradient operator in the second direction, respectively. In one embodiment, the first convolution circuit unit 2022 can perform the convolution operation on the image I by using a gradient operator Kx in an x direction to obtain the first-direction gradient data Gx, and the second convolution circuit unit 2024 can perform the convolution operation on the image I by using a gradient operator Ky in a y direction to obtain the second-direction gradient data Gy, wherein the x direction (that is, the first direction) is perpendicular to the y direction (that is, the second direction).

For example, when coordinates of a target pixel A in the image I are (i, j), the image edge detection device 20 can obtain the first-direction gradient data Gx and the second-direction gradient data Gy according to step 104 of the image edge detection method 10, based on equations (1) to (4) shown below:

$$Kx=[-1\ 0\ 1] \quad (1)$$

$$ky=[-1\ 0\ 1]^T \quad (2)$$

$$Gx(i,j)=\Sigma_{m=-1}^{1}I(i,j+m)Kx(m) \quad (3)$$

$$Gy(i,j)=\Sigma_{m=-1}^{1}I(i+m,j)Ky(m) \quad (4)$$

In the equations above, Kx is the gradient operator in the x direction, Ky is the gradient operator in the y direction, Gx(i, j) represents a convolution result of the target pixel A and the gradient operator Kx in the x direction, and Gy(i, j) represents a convolution result of the target pixel A and the gradient operator Ky in the y direction.

In existing image edge detection techniques, only gradient information of one single pixel is used to determine a direction of an edge in an image, and the texture or weak edges in the image cannot be effectively recognized, such that the recognition accuracy of an edge in an image is affected. Thus, the image edge detection method 10 according to an embodiment of the present application further uses gradient information of pixels within a neighboring area of the target pixel A to recognize an edge in an image, wherein the neighboring area can include at least one neighboring pixel of the target pixel A. In one embodiment, the neighboring area may be neighboring pixels of 5*5 or 7*7 pixel units neighboring to the target pixel A.

In step 106, the image edge detection method 10 performs a gradient statistical calculation within the neighboring area of the target pixel A of the image I according to the first-direction gradient data Gx and the second-direction gradient data Gy to obtain a gradient statistic.

In practice, according to the first-direction gradient data Gx and the second-direction gradient data Gy of the target pixel A, the multiplying circuit 204 can calculate a square Gxx, being equal to GxGx, of the first-direction gradient data Gx, a square Gyy, being equal to GyGy, of the second-direction gradient data Gy, and a product Gxy, being equal to GxGy, of the first-direction gradient data Gx and the second-direction gradient data Gy.

Next, the statistics circuit 206 can calculate the gradient statistic within the neighboring area of the target pixel A according to a weighting coefficient, the square Gxx of the first-direction gradient data Gx, the square Gyy of the second-direction gradient data Gy and the product Gxy of the first-direction gradient data Gx and the second-direction gradient data Gy, wherein the weighting coefficient can be a Gaussian weighting or a mean weighting coefficient.

When the weighting coefficient w is a Gaussian weighting coefficient, it can be represented as an equation (5):

$$w(m, n) = \exp\left(-\frac{m^2 + n^2}{\sigma^2}\right) \quad (5)$$

When the weighting coefficient w is a mean weighting coefficient, it can be represented as an equation (6):

$$w(m,n)=1 \quad (6)$$

In the equations above, σ is a standard deviation of a normal distribution, and values of m and n denote a range of the neighboring area of the target pixel A. For example, when the neighboring area is 5*5 pixel units, the values of m and n are respectively integers between −2 to 2 (that is, −2, −1, 0, 1 and 2); when the neighboring area is 7*7 pixel units, the values of m and n are respectively integers between −3 and 3 (that is, −3, −2, −1, 0, 1, 2 and 3).

Thus, the gradient statistics Ixx(i,j), Iyy(i,j), Ixy(i,j) can be represented as equations (7), (8) and (9):

$$Ixx(i, j) = \frac{1}{(2r+1)^2}\sum_{m=-r}^{r}\sum_{n=-r}^{r}w(m, n)Gxx(i+m, j+n) \quad (7)$$

$$Iyy(i, j) = \frac{1}{(2r+1)^2}\sum_{m=-r}^{r}\sum_{n=-r}^{r}w(m, n)Gyy(i+m, j+n) \quad (8)$$

$$Ixy(i, j) = \frac{1}{(2r+1)^2}\sum_{m=-r}^{r}\sum_{n=-r}^{r}w(m, n)Gxy(i+m, j+n) \quad (9)$$

It should be noted that, step 104 and step 106 of the image edge detection method 10 merely describe the calculation for the gradient statistics Ixx(i,j), Iyy(i,j), Ixy(i,j) of the neighboring pixels of the target pixel A for one single target pixel A. In practice, the image edge detection method 10 of an embodiment of the present application calculates corresponding gradient statistics Ixx(i,j), Iyy(i,j), Ixy(i,j) for all pixels in the image I by using the image edge detection method 10.

In this case, the image edge detection method 10 of an embodiment of the present application uses the gradient information of the target pixel A and the pixels of the neighboring area of the target pixel A as the basis for determining the direction of an edge of the image, so as to enhance the accuracy in direction determination of an edge in the image.

In step 108, the image edge detection method 10 determines, according to the gradient statistics Ixx(i,j), Iyy(i,j), Ixy(i,j), an edge significant Je corresponding to the target pixel A.

More specifically, the edge significance Je can be determined according to a covariance matrix of a second-order statistic of the gradient statistics Ixx(i,j), Iyy(i,j), Ixy(i,j). For example, a covariance matrix Cxy of the gradient statistics L can be represented as an equation (10):

$$Cxy = \begin{bmatrix} Ixx & Ixy \\ Ixy & Iyy \end{bmatrix} \quad (10)$$

When a difference between an eigenvalue in a main direction of the covariance matrix Cxy and an eigenvalue in a secondary direction gets larger, it means that the edge significance of the target pixel A is greater, wherein the main direction is orthogonal to the secondary direction. Since the gradient statistics Ixx(i,j), Iyy(i,j), Ixy(i,j) are obtained according to the gradient information of the target pixel A and that of the pixels of its neighboring area, when $\lambda_1 \gg \lambda_2$, it is possible that the corresponding neighboring area is an edge area.

In one embodiment, the image edge detection method 10 of an embodiment of the present application can then set the edge significance Je as:

$$Je = \frac{\lambda_1}{\lambda_2} + \frac{\lambda_2}{\lambda_1} \quad (11)$$

As a difference between $\lambda_1$ and $\lambda_2$ increases, the edge significance gets larger; when $\lambda_1$ and $\lambda_2$ are equal, the edge significance Je=2. Moreover, equation (11) can also be derived into an equivalent equation (12):

$$Je = \frac{Ixx^2 + Iyy^2 - 2Ixy^2}{IxxIyy - Ixy^2} \quad (12)$$

In practice, the edge significance Je can be determined by the determining circuit 208, and the determining circuit 208 can calculate the edge significance Je by the equation (11) or equation (12).

In step 110, the image edge detection method 100 normalizes the edge significance Je corresponding to the image I, and determines an edge data of the image I by means of mapping. Method 10 thereafter ends at step 112.

Since the range of the edge significance Je is [2, ∞), a normalization of the edge significance Je needs to be performed between 0 and 1 in an actual application, and a mapping of the edge significance Je also needs to be performed so as to meet requirements of an application scenario. The image edge detection method 10 of an embodiment of the present application normalizes the edge significance Je corresponding to the image I, and determines an edge data Jec of the image I by means of a mapping, wherein the edge data Jec is represented as:

$$Jec = f(Je) \quad (13)$$

In one embodiment, the image edge detection method 10 can adjust the edge significance Je to an appropriate value by a mapping function $f(\cdot)$, and the mapping above can be simple linear mapping, lookup table (LUT) mapping, exponential mapping or logarithmic mapping.

When the means of mapping is the simple linear mapping, the edge data Jec can be represented as:

$$Jec = \min(\max(\alpha(Je-b),0),1) \quad (14)$$

Figure 3:
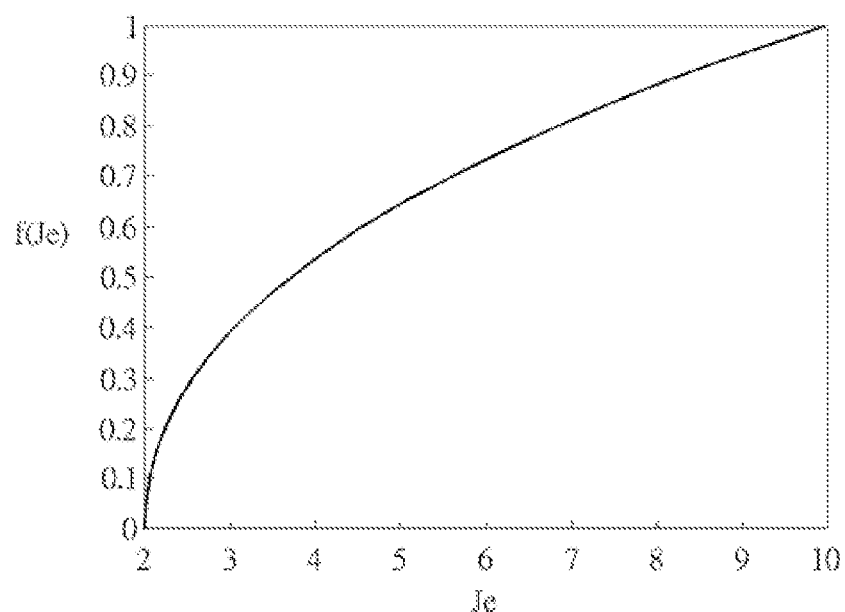
FIG. 3 is a schematic diagram of a mapping curve of a mapping function according to an embodiment of the present application.

When the means of mapping is the LUT mapping, the mapping process can be performed according to an LUT corresponding to the curve shown in FIG. 3, and LUT mapping is performed after first clipping the edge significance Je to a certain range. In this case, the edge data Jec can be represented as:

$$Jec = LUT(\min(\max(Je,a),b)) \quad (15)$$

In practice, the processing circuit 210 can be used to normalize and perform mapping of the edge significance Je. In one embodiment, the processing circuit 210 includes an LUT circuit, which completes the mapping process by looking up an LUT stored in a memory in advance.

It should be noted that, the image edge detection method 10 of an embodiment of the present invention can select different means of mapping in response to different application scenarios so as to adjust the edge significance Je. For example, when the sensitivity (ISO value) of the image I is a low sensitivity (for example, ISO 100), the LUT circuit of the processing circuit 210 performs the mapping process by looking up a first LUT; when the sensitivity (ISO value) of the image I is a high sensitivity (for example, ISO 3200), the LUT circuit of the processing circuit 210 performs the mapping process by looking up a second LUT, wherein the first LUT and the second LUT correspond to different mapping curves.

Figure 4:
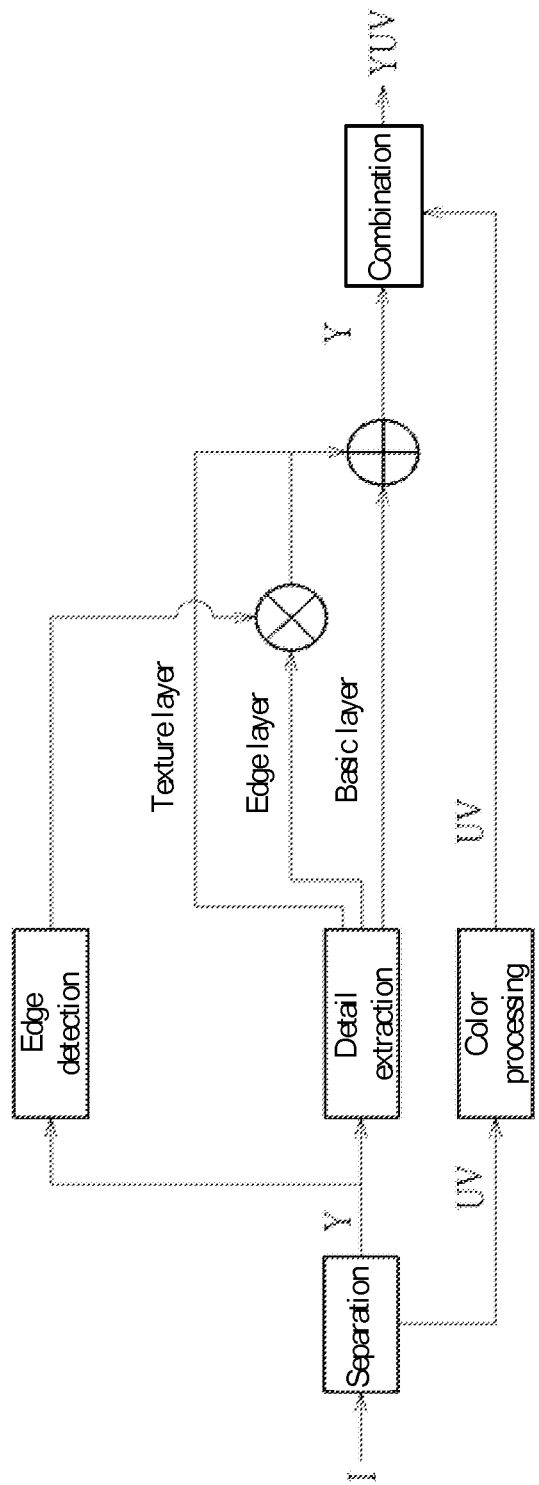
FIG. 4 is a schematic diagram of an application scenario according to an embodiment of the present application.

Refer to FIG. 4 showing a schematic diagram of an application scenario according to an embodiment of the present application. The edge data Jec of the pixels of the image I generated by the image edge detection method 10 of an embodiment of the present application can be applied to a sharpening process of the image I.

The sharpening process is used to enhance the sharpness of an image, and in general, the sharpening process is performed with respect to a Y channel (that is, the luminance channel) of a YUV image. As shown in FIG. 4, the Y channel is first separated when the image I is processed. Next, details are extracted from the Y channel to generate a texture layer, an edge layer and a basic layer, and the edge significance Je generated by the image edge detection method 10 of an embodiment of the present application can be used as a parameter for adjusting the edge layer of the image. In practice, the edge data Jec obtained after the normalization and mapping process of the edge significance Je is used to adjust the edge layer of the image.

In one embodiment, the edge data Jec can be multiplied with the corresponding edge layer (as shown in FIG. 4, that is, the edge data Jec is a multiplication coefficient of the edge layer). In other embodiments, the edge data Jec can also be used to adjust the edge layer by other logical operation means such as addition, subtraction or division. Finally, the edge layer of the image adjusted using the edge data Jec of an embodiment of the present application is combined with the basic layer to obtain a sharpened Y channel, the sharpened Y channel is then combined with UV channels having undergone color processing so as to output a processed YUV image.

Figure 5:
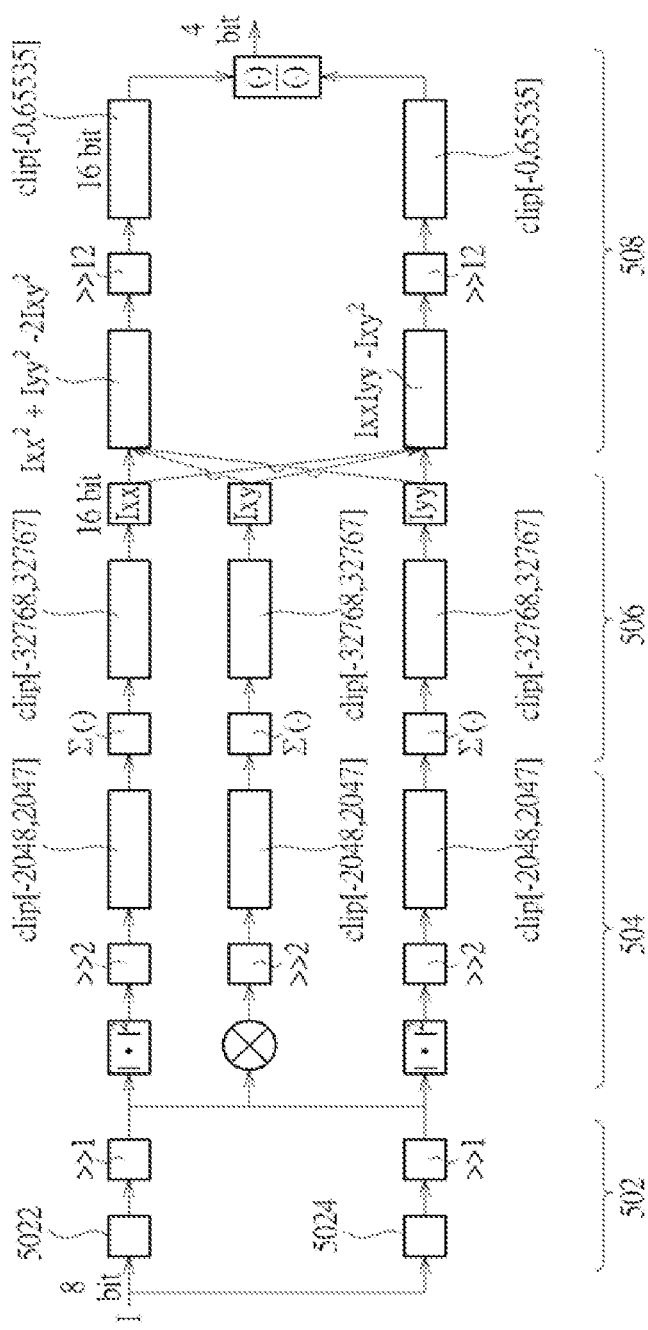
FIG. 5 is a schematic diagram of an image edge detection device according to another embodiment of the present application.

Refer to FIG. 5 showing a schematic diagram of an image edge detection device 50 according to an embodiment of the present application. The image edge detection device 50 can also be used to perform the image edge detection method 10. The image edge detection device 50 includes a convolution circuit 502, a multiplying circuit 504, a statistics circuit 506 and a determining circuit 508, wherein the convolution circuit 502 includes convolution circuit units 5022 and 5024.

As shown in FIG. 5, the image I is input to the image edge detection device 50, and convolution operations are performed on the image I individually by the convolution circuit units 5022 and 5024 (for example, the convolution circuit unit 5022 performs a convolution operation on the image I by using a gradient operator Kx in the x direction, and the convolution circuit unit 5024 performs a convolution operation on the image I by using a gradient operator Ky in the y direction), to obtain the first-direction gradient data Gx and the second-direction gradient data Gy. To meet requirements and/or reduce a computation amount of the multiplying circuit 504, the convolution circuit 502 may include multiple shift circuits to shift outputs of the convolution circuit units 5022 and 5024 (for example, shifting to the right by one bit).

Next, the multiplying circuit 504 calculates the square Gxx of the first-direction gradient data Gx, the square Gyy of the second-direction gradient data Gy, and the product Gxy of the first-direction gradient data Gx and the second-direction gradient data Gy by using a squaring circuit and a multiplication circuit, and shifts the results thereof to the right by two bits and clips −2048 to 2047 bits by using the shift circuits and a clip circuit Clip[′], so as to meet requirements and/or reduce a computation amount of the statistics circuit 506.

Further, the statistics circuit 506 includes a summing circuit Σ(·) and a clip circuit Clip['] so as to calculate the gradient statistic Ixx(i,j), Iyy(i,j), Ixy(i,j) within a local area according to the gradient data of the neighboring area neighboring to the target pixel A, and perform clipping.

Finally, the determining circuit 508 implements the equation (12) above by a logical operation circuit, the shift circuits, the clip circuit Clip['] and a division circuit, so as to obtain the corresponding edge significance Je. In one embodiment, the image edge detection device 50 can further include a processing circuit (not shown) to normalize and perform mapping on the edge significance Je so as to meet requirements of application scenarios.

It should be noted that, the number of bits shown in FIG. 5 is for illustrating the relations of bits of the various circuits of the image edge detection device 50, but is not to be construed as a limitation to the implementation of the image edge detection device 50. Moreover, hardware circuits in the image edge detection device 50 and connection relations thereof exemplify merely one circuit implementation form for performing the image edge detection method 10, and the present application is not limited thereto.

In conclusion, the image edge detection method and the image edge detection device provided by the present application determine an edge in an image by gradient statistics information of an area neighboring to a target pixel, further effectively enhancing detection accuracy of a directional edge in an image.

The description above provides merely preferred embodiments of the present application, and all variations and modifications made based on the range of claims of the present application are to be encompassed within the scope of the present application.

What is claimed is:

1. An image edge detection method, for processing an image comprising a plurality of pixels, the method comprising:
    performing a convolution operation on the image by a gradient operator in a first direction and a gradient operator in a second direction, respectively, to obtain a first-direction gradient data and a second-direction gradient data, wherein the first direction is perpendicular to the second direction;
    performing a gradient statistical calculation within a neighboring area of a target pixel of the image according to the first-direction gradient data and the second-direction gradient data and accordingly obtaining a gradient statistic; and
    determining an edge significance (Je) corresponding to the target pixel according to the gradient statistic,
    wherein the edge significance is determined according to a covariance matrix of the gradient statistic, and
    wherein the edge significance of the target pixel increases as a difference between an eigenvalue in a main direction of the covariance matrix and an eigenvalue in a secondary direction of the covariance matrix gets larger according to:

$$Je = \frac{\lambda_1}{\lambda_2} + \frac{\lambda_2}{\lambda_1}.$$

2. The image edge detection method according to claim 1, wherein the obtaining the gradient statistic comprises:
    calculating a square of the first-direction gradient data, a square of the second-direction gradient data, and a product of the first-direction gradient data and the second-direction gradient data, and accordingly obtaining the gradient statistic.

3. The image edge detection method according to claim 1, wherein the obtaining the gradient statistic comprises:
    obtaining the gradient statistic according to a weighting coefficient, the first-direction gradient data and the second-direction gradient data.

4. The image edge detection method according to claim 1, wherein the neighboring area comprises the target pixel and at least one neighboring pixel of the target pixel.

5. The image edge detection method according to claim 1, wherein the main direction and the secondary direction are orthogonal.

6. The image edge detection method according to claim 1, further comprising:
    normalizing the edge significance corresponding to the image, and determining an edge data of the image by means of mapping.

7. The image edge detection method according to claim 6, further comprising:
    performing a sharpening process on the image according to the edge data.

8. An image edge detection device, for processing an image comprising a plurality of pixels, the device comprising:
    a convolution circuit, comprising a first convolution circuit unit and a second convolution circuit unit, configured to perform a convolution operation on the image by a gradient operator in a first direction and a gradient operator in a second direction, respectively, to obtain a first-direction gradient data and a second-direction gradient data, wherein the first direction is perpendicular to the second direction;
    a statistics circuit, configured to perform a gradient statistical calculation within a neighboring area of a target pixel of the image according to the first-direction gradient data and the second-direction gradient data to obtain a gradient statistic; and
    a determining circuit, configured to determine an edge significance (Je) corresponding to the target pixel according to the gradient statistic,
    wherein the determining circuit determines the edge significance according to a covariance matrix of the gradient statistic, and
    wherein the edge significance of the target pixel increases as a difference between an eigenvalue in a main direction of the covariance matrix and an eigenvalue in a secondary direction of the covariance matrix gets larger according to:

$$Je = \frac{\lambda_1}{\lambda_2} + \frac{\lambda_2}{\lambda_1}.$$

9. The image edge detection device according to claim 8, further comprising:
    a multiplying circuit, configured to calculate a square of the first-direction gradient data, a square of the second-direction gradient data, and a product of the first-direction gradient data and the second-direction gradient data.

10. The image edge detection device according to claim 8, wherein the statistics circuit is configured to obtain the gradient statistic according to a weighting coefficient, the first-direction gradient data and the second-direction gradient data.

11. The image edge detection device according to claim 8, wherein the neighboring area comprises the target pixel and at least one neighboring pixel of the target pixel.

12. The image edge detection device according to claim 8, wherein the main direction and the secondary direction are orthogonal.

13. The image edge detection device according to claim 8, further comprising:
   a processing circuit, configured to normalize and perform mapping on the edge significance corresponding to the image to obtain an edge data of the image.

* * * * *